Patented Jan. 15, 1929.

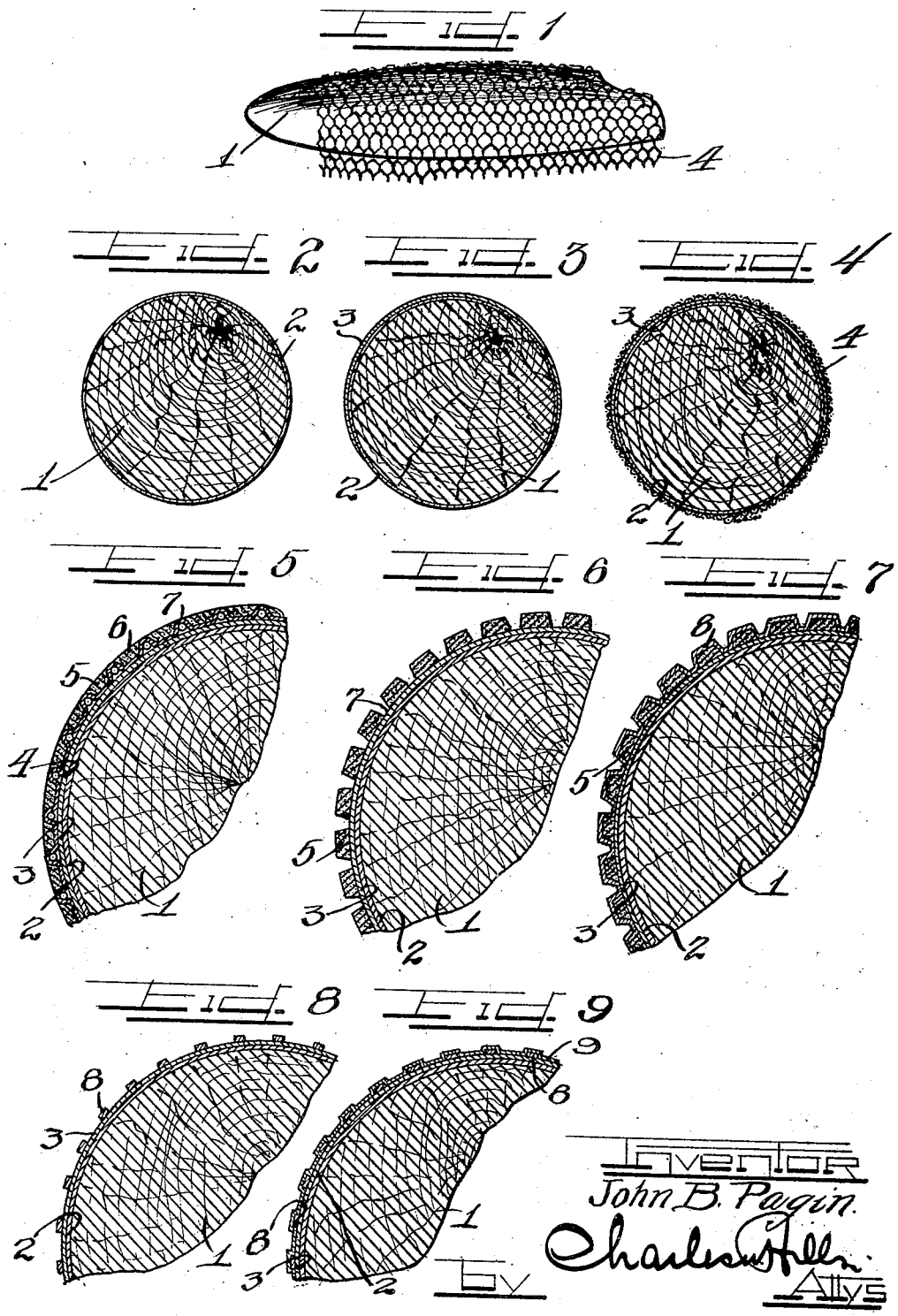

1,698,964

UNITED STATES PATENT OFFICE.

JOHN B. PAGIN, OF SOUTH BEND, INDIANA, ASSIGNOR TO THE SOUTH BEND BAIT COMPANY, A CORPORATION OF INDIANA.

METHOD OR PROCESS OF FINISHING BAITS.

Application filed August 8, 1927. Serial No. 211,237.

This invention relates to a method of decorating fish baits to obtain a realistic scale-like effect on the finished bait.

The object of this invention, therefore, is to provide a method for finishing fish baits to resemble closely the natural minnow or other small fish ordinarily used for live bait.

Other and further important objects of this invention will become more apparent from the following description and appended claims.

As illustrative of the preferred method of decorating fish baits, there are shown the accompanying drawings in which:

Figure 1 is a side elevational view of an unfinished fish bait, illustrating one step in the process.

Figure 2 is an enlarged transverse sectional view of a fish bait to which a ground coat of paint has been applied.

Figure 3 is a similar sectional view illustrating the next step in the process.

Figure 4 is a similar sectional view illustrating a method of applying a flexible stencil to the bait.

Figures 5 to 9 inclusive are enlarged fragmentary sectional views, illustrating successive steps in the finishing process.

As shown on the drawings:

The reference numeral 1 indicates a bait or plug, as commonly called, of the type used by fishermen in trolling and casting. Said bait 1 is preferably formed of wood imitating approximately the size and contour of a live fish bait. In accordance with the principles of my invention, the bait body is first given a ground coating 2 (Figure 2) of paint or pigment, any suitable white paint being preferably used. White is preferred for the reason that the coat of paint 2 ultimately represents the belly of the bait, as will later appear.

To the bait 1 there is next applied over the coating 2 a second coating of paint 3 (Figure 3) which should be of a color that is satisfactory for the representation of scales. The coating 3 may suitably be applied by means of a spray gun over the upper portion and sides of the bait 1, leaving the lower or belly portion uncoated.

The next step in the process, illustrated by Figure 4, consists in wrapping about the bait body a flexible stencil 4, which may suitably be a piece of open mesh fabric, the perforations of which should closely imitate the outline of scales of a fish. It will be understood, however, that any flexible stencil having cut out portions of suitable design may be employed.

There is then applied through the meshes of the flexible stencil 4 a layer 5 of some suitable non-coherent pasty material. A fixed suspension of chalk and water is adapted to be used for this purpose, as it may readily be sprayed upon the bait body and subsequently be removed by washing. The excess of pasty material forming the layer 5 is removed until the outer surface 6 of said layer lies flush with the raised portions 7 of the flexible stencil 4.

The flexible stencil 4 is then removed, leaving an irregular surface as shown in Figure 6, wherein the coating 5 is shown as comprising separate coated areas of the size and shape of the perforations of the flexible stencil 4 separated from each other by uncoated areas 7 which were protected by the solid portions of said stencil 4.

There is next applied over the entire surface of the bait body, which surface now comprises the coating 5 and the exposed coating of paint 3, a third coating of paint 8 (Figure 7). The coating of paint is preferably applied by means of a spraying device, such as an air brush, over the entire upper surface. Said coating 8 will naturally adhere tightly to the previous coating 3 but more or less loosely to the coating 5 of pasty material.

Said coating 5 is next removed. This may be easily done by directing fine jets of water against the surface of the bait body or by means of water and a brush. The portions of the coating of paint 8 adhering to the coating layer 5 are also removed during this process, leaving merely that portion of the coating of paint 8 which adhered to the undercoating 3 (Figure 8). The adhering portion of the coating 8 will naturally occupy the ralative positions occupied by the solid portions of the flexible stencil 4 and will thus form the outlines of the scales. Accordingly, the coating of paint 8 should be of a color that will contrast suitably with the color of the coating 3, which now forms the body of the scales.

The final step in the process preferably consists in applying a transparent water proof varnish or lacquer to form an outer coating 9 (Figure 9). There is thus produced a finished fish bait having scales closely resembling in appearance the scales of a live bait with the outlines of the scales raised above the surface of the body of the bait.

It will be understood that various colors and designs may be employed to obtain any particular effect that may be desired. The important feature of my invention is the means and method by which a portion of the painted surface of the bait is protected while the coating of paint intended to represent the outline of the scales is being applied. According to this method, the coating representing the outline of the scales is applied over the coating representing the body of the scales and thus causes the scales to stand out more distinctly and prominently, than were the reverse of this process employed.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The method of decorating fish bait to obtain a life-like scale effect, which comprises applying a ground coat of paint to a blank bait, painting the top and sides of said lure with a paint of a contrasting color, wrapping an open mesh fabric about said lure, spraying a coating of relatively non-coherent material over said mesh fabric, removing excess material, removing the mesh fabric, applying a coat of paint over the surfaces so formed, removing the non-coherent material and paint adhering thereto and applying a transparent final coat over the surface formerly occupied by said material and the paint occupying the outline surface formerly occupied by the stencil.

2. The method of decorating fish baits to obtain a realistic scale-like effect, which comprises applying a coat of paint to a bait of the desired color to represent scales, enclosing said lure with a perforated stencil, applying an easily washed away paste through said stencil, removing the stencil, applying a coating of paint over the surface of said material and the outlines formerly occupied by the stencil of a contrasting color to represent the scale outlines and removing the paste and paint adhering thereto and leaving the paint on the outlines.

3. The process of decorating fish baits to obtain a realistic scale-like effect, which includes the steps of wrapping a flexible open mesh fabric about the bait, depositing upon the surface of the bait through the meshes of the fabric a pasty material adapted to be easily washed away, removing the fabric, applying a coat of paint to the surface so formed and removing the pasty material and paint adhering thereto, whereby the paint adhering to the surface of the bait defines the outlines of scales.

4. The process of decorating fish baits to obtain a realistic scale-like effect, which comprises enclosing a painted bait with a flexible stencil having openings therein resembling fish scales in size and shape, depositing through said openings upon the surface of the bait a non-coherent material adapted to be easily washed away, removing the stencil, applying a contrasting coat of paint over the surfaces of the non-coherent material and the spaces formerly occupied by said stencil so formed and removing the non-coherent material with paint adhering thereto, thereby uncovering the original coat of paint covered by said non-coherent material.

5. In the process of decorating fish baits, the step of applying to said bait through a stencil a protective coating of non-coherent material adapted subsequently to be readily washed away, removing the stencil and applying a coat of paint over the protective coating and unprotected surfaces formerly covered by the stencil and removing the protective coating with whatever paint there may be adhering thereto and leaving the paint on the outline surfaces formerly occupied by the stencil.

In testimony whereof I have hereunto subscribed my name at South Bend, St. Joseph County, Indiana.

JOHN B. PAGIN.